(12) United States Patent
Ballal

(10) Patent No.: US 10,521,735 B2
(45) Date of Patent: Dec. 31, 2019

(54) SYSTEM FOR ROUND TRIP ENGINEERING OF DECISION METAPHORS

(71) Applicant: FAIR ISAAC CORPORATION, San Jose, CA (US)

(72) Inventor: Pradeep Niranjan Ballal, Singapore (SG)

(73) Assignee: FAIR ISAAC CORPORATION, Roseville, MN (US)

( * ) Notice: Subject to any disclaimer, the term of this patent is extended or adjusted under 35 U.S.C. 154(b) by 763 days.

(21) Appl. No.: 15/050,200

(22) Filed: Feb. 22, 2016

(65) Prior Publication Data
US 2017/0243123 A1    Aug. 24, 2017

(51) Int. Cl.
| | |
|---|---|
| *G06Q 10/00* | (2012.01) |
| *G06Q 10/10* | (2012.01) |
| *G06Q 40/02* | (2012.01) |
| *G06F 8/10* | (2018.01) |

(52) U.S. Cl.
CPC ............. *G06Q 10/00* (2013.01); *G06Q 10/10* (2013.01); *G06Q 40/025* (2013.01); *G06F 8/10* (2013.01)

(58) Field of Classification Search
CPC ....... G06F 11/3664; G06F 8/10; G06Q 10/00; G06Q 10/10; G06Q 40/025
See application file for complete search history.

(56) References Cited

U.S. PATENT DOCUMENTS

| | | | | |
|---|---|---|---|---|
| 7,318,046 B1* | 1/2008 | Wellons | ................ | G06Q 30/06 705/38 |
| 2003/0229825 A1* | 12/2003 | Barry | ................ | G06F 11/3672 714/38.14 |
| 2013/0305224 A1* | 11/2013 | Eade | ........................ | G06F 8/20 717/126 |
| 2014/0279810 A1* | 9/2014 | Mann | .................... | G06Q 30/00 706/47 |

OTHER PUBLICATIONS

Huang et al., "Credit scoring with a data mining approach based on support vector machines", Nov. 2007, Expert Systems with Applications, vol. 33, Issue 4, pp. 847-856 (Year: 2007).*

* cited by examiner

*Primary Examiner* — Kamran Afshar
*Assistant Examiner* — Brent Johnston Hoover
(74) *Attorney, Agent, or Firm* — Mintz Levin Cohn Ferris Glovsky and Popeo, P.C.

(57) ABSTRACT

A testing framework associated with a decision metaphor model tool reads table profile files to generate requests for a test of a decision metaphor. The testing framework sends the requests for the test to a decision engine and receives responses for the requests for comparison against expected values and possible errors. The testing framework also outputs an output file that includes a result of the test, where the output file is formatted in a computer-displayable and user-readable graphical format.

17 Claims, 3 Drawing Sheets

| Document Letter of Collateral is submitted (DOC_INC_14_C OLLATERAL) | Ref no. 112 in harvest workbook | | | |
|---|---|---|---|---|
| Bundle Flag | dm_get_is_bundle from Annex 3. Common data methods | | | |
| Apply Type | Template code not bundle | Document: Letter of Collateral is submitted | Bundle Flag | OUTPUT |
| String | string | string | string | string |
| INPUT | INPUT | INPUT | INPUT | OUTPUT |
| Apply Type | TemplateCodeNotBundle | Submitted_letterofCollateral | BundleFlag | OUTPUT |
| NEW | true | true | false | PP-KEC-DG-INC\|true |
| INC | true | true | false | PP-KEC-DG-INC\|true |
| EOT | | | | |

SYSTEM FOR ROUND TRIP ENGINEERING OF DECISION METAPHORS

TECHNICAL FIELD

This disclosure relates generally to automatic generation of test conditions for a decision engine based on reading data from an electronic document.

BACKGROUND

FICO's Originations Manager Decision Module (henceforth referred to as OM-DM) and Blaze Advisor are examples of computing systems that provide extensive functionality for configuring business strategies quickly via an intuitive rules management web interface. These strategies comprise the "brain" of a system (such as a Loan Origination System) by automating all operational decision making.

In any implementation of a decision system, requirement analysis and clear and unambiguous definitions of decision metaphors are very important. A decision metaphor is a graphical representation of business rules and is provided by the decision engine. Also important is careful configuration of these decision metaphors into the rules engine, as well as extensive unit testing to ensure there are no human configuration errors.

SUMMARY

In one aspect, an electronic document is received by a decision metaphor model tool. The electronic document has content that includes requirement analysis and design artifacts in a computer-readable format. The requirement analysis and design artifacts define a decision metaphor that graphically represents business rules for execution by a decision engine. The decision metaphor model tool is programmed with logic to read and interpret the content of the electronic document.

The decision metaphor model tool reads, according to the programmed logic, the requirement analysis and design artifacts from the electronic document to create an intermediate model of the requirement analysis and design artifacts. The intermediate model is formatted into one or more computer-readable table import files. The decision metaphor model tool outputs, with the intermediate model to a communication network, the table import files and one or more table profile files containing test data for testing of the decision metaphor. The decision metaphor model tool also reads the one or more table import files for import into the decision engine.

A testing framework, associated with the decision metaphor model tool and programmed with test logic to read and interpret the table profile files, reads the table profile files to generate requests for a test for the decision metaphor. The testing framework sends the requests for the test to the decision engine and receives, from the decision engine, responses for the requests for comparison against expected values and possible errors. The testing framework also outputs an output file that includes a result of the test, where the output file is formatted in a computer-displayable and user-readable graphical format.

In some variations one or more of the following can optionally be included.

The testing framework can read negative test values generated by the decision metaphor model tool and stored with the one or more table profile files.

The decision metaphor model tool can generate second table profile files comprising boundary conditions or negative conditions for rules generated by the decision metaphor model tool. Also, the decision metaphor model tool can store the generated second table profile files with the one or more table profile files.

An expected outcome from testing the decision metaphor with the decision engine can be added to the table profile files.

The decision metaphor model tool can only accept the electronic document when it is in a pre-formatted spreadsheet document including at least one of: operators, range values, or partial scores.

Instructions can be transmitted for displaying errors in a graphical display.

Implementations of the current subject matter can include, but are not limited to, systems and methods consistent with features described herein, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 is a screen capture of a structured document for use with a decision metaphor model tool.

When practical, similar reference numbers denote similar structures, features, or elements.

DETAILED DESCRIPTION

As used herein, the term "reads" or "reading" refers to accessing, copying, referencing, or moving of data and/or files from a source to a destination. The source and destination can be a database, hard drive, memory objects or variables created during execution of a computer program, or any form of computer memory.

This document presents a system and method for round trip engineering of decision metaphors. As used herein, a "decision metaphor" is a graphical representation of business rules and can be provided by a decision engine, such as OM-DM. Examples of decision metaphors can include:

Decision Tables—provides a tabular representation of logic

Decision Trees—represents decision logic in the form of trees

Scorecard Models—a mathematical model to calculate a score and represent the model graphically using bins and ranges.

As used herein, a "unit" is any entity within a decision model configuration that participates in decision making. These entities can include, without limitation: decision tables; decision trees, scorecard models, rulesets, data methods, and/or data object references.

At a high level, this approach can begin with standardizing analysis and design artifact. As used herein, "analysis and design artifacts," hereinafter "artifacts" refer to a file or spreadsheet that can contain data describing features used in a decision model, for example, limitations (age limits, income limits, score limits), ranges (income, age, employment duration, scores), etc. Such features, when tested, can be part of a configuration for a decision model.

Tool support can then be provided to manipulate the analysis and design artifacts to forward engineer (generate executable code) into OM-DM decision metaphors (a decision model) and reverse engineer to update the analysis and design artifacts. In addition, tool support can also be provided to automatically generate thousands of test cases which will extensively test these metaphors to ensure a correct configuration has been made.

Figure 1:
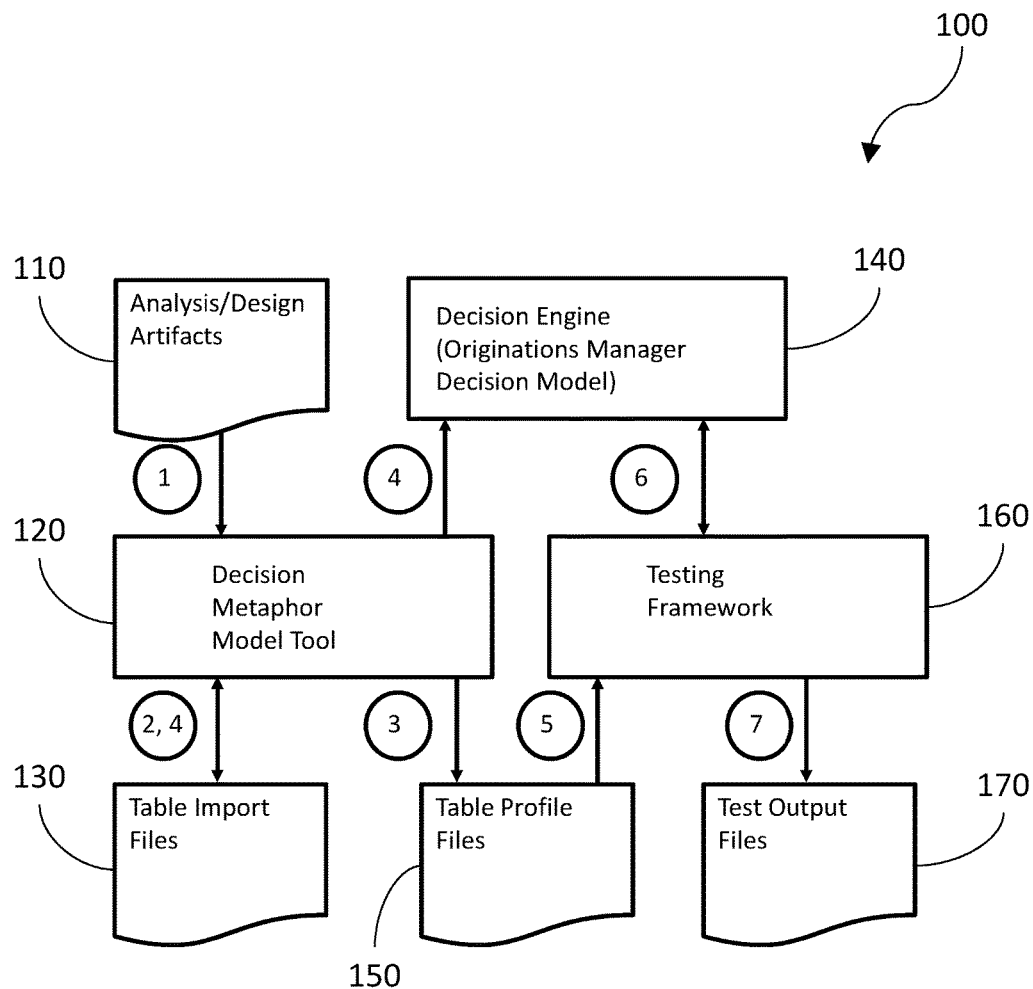
FIG. 1 is a process flow diagram illustrating a decision metaphor model tool and a testing framework generating test output files.

FIG. 1 illustrates a system 100 for roundtrip engineering. The system 100 includes a decision metaphor model tool 120 that receives the artifacts 110 and table import files 130, and outputs table profile files. The decision metaphor model tool 120 is connected with a decision engine 140 that executes a decision model. The system 100 further includes a testing framework 160 that receives input from the decision engine 140 and the table profile files 150, and which generates test output files 170. To accomplish the round trip engineering, the system 100 can execute a process as described below.

At step 1, the artifacts 110 can be provided as one or more electronic documents in a standardized format, for example, in a spreadsheet, table, word processing document, etc. In some implementations, this format can be an adjusted format from the current widely used format within the software industry. These documents can be sent as an input to a decision metaphor model tool 120. The decision metaphor model tool 120 can be programmed with logic to read and interpret the content of the electronic document containing the artifacts 110.

At step 2, the decision metaphor model tool 120 can read, according to the programmed logic, the artifacts 110 and create an "intermediate model" that accurately represents the contents of the artifacts 110. This essentially translates the artifact files 110 that were provided in step 1 into a framework 160 that can be executed later to test the model. The intermediate model can be transformed into a number of output artifacts, and algorithms to do so can be implemented in the decision metaphor model tool 120. The decision metaphor model tool 120 can then output the intermediate model into table import files 130 in a format that is ready to be imported into a decision engine 140.

Table import files 130 contain the actual configuration that forms basis of logic of the decision metaphor such as a table or a decision tree. These files can be in a format that can be imported into the decision engine 140. Therefore, intermediate model, based on the table import files 130, will have axes (or dimensions) that will be an accurate representation of the axes information described by the artifacts file 110. For example, if the artifacts file 110 contained a table with 10 condition columns, 10 case rows and 1 action column, the intermediate model will also contain 10 condition columns, 10 case rows and 1 action column for a total of 10 rules).

At step 3, the decision metaphor model tool 120 outputs, to a communication network, table profile files 150 in a predefined format, for example, as comma-separated values (CSV). The table profile files 150 describe the parameters of the tests that the decision engine 140 will execute. For example, after analyzing the artifacts 110, it can be determined that only certain age ranges, income values, and so on, need be tested. The table profile files 150 can contain 100s or 1000s of rows that fully profiles the intermediate model based on the requirements defined by the choice of artifacts 110. The intent of the table profile files 150 is to exhaustively test all possible scenarios of the intermediate model including negative conditions, so the upper and lower boundary cases can be determined by the profiling algorithm.

These table profile files 150 can contain extensive test data that can exercise each metaphor a number of times so that each cell is tested. The computer-implemented method also covers testing for boundary conditions and unexpected values (i.e. both positive and negative test cases are created automatically by the decision metaphor model tool 120). The positive and negative test cases can be generated by the decision metaphor model tool 120 and stored as part of the table profile files 150.

At step 4, the decision metaphor model tool 120 can read the intermediate model files and automatically output them into the decision engine 140. Once imported by the decision engine 140, these metaphors are ready to be executed by the decision engine 140.

At step 5, meanwhile, the table profile files 150 that were generated earlier (as part of step 3) can be read by a testing framework 160, and requests can be formulated by the testing framework 160 to exercise the imported metaphor. The testing framework 160 can be a generic testing framework 160 and computing system, or a special purpose processor that is programmed for such steps. The testing framework 160 can also be programmed with test logic to read and interpret the table profile files 150.

At step 6, the testing framework 160 can send the request to the decision engine 140 and wait for the response. The testing framework 160 can then further check the response against expected values, and where there are errors, can highlight the errors. In some implementations, the testing framework 160 can generate a graphical display that is viewable by a user, where the graphical display can include the highlighted errors, such as represented by a unique color, graphic, or character.

At step 7, the results of testing are recorded in test output files 170 which can be easily shared with team members and customers via an electronic communications network that can include any number of wireless or wired communications channels.

Test Configuration

FIG. 2 is a screen capture 200 of a structured document for use with a decision metaphor model tool 120. In some preferred exemplary implementations, structured documents, for example pre-formatted spreadsheet documents, can be used during requirement analysis as a basis for design and configuration of the decision engine 140. These designs can be quite detailed with all configurations presented in spreadsheets containing all configuration information including operators, range values, partial scores and so forth. In some implementations, such a document can be standardized where the "format" of the design is in a predefined format. An example of this format is shown in FIG. 2 (for a decision table).

Such structured documents can be used by the decision metaphor model tool 120 to read a decision table/scorecard model detailed design document and generate: 1) table import intermediate files; and 2) CSV files that contain test data to test the configuration. Once configuration is completed, this test data can be used to run these entities in an automated manner to verify the correctness of the configuration.

In some implementations, most of the logic resides within decision metaphors followed by sequential code-like functions. This is also in line with the best practice of designing rule services where graphical metaphors are used to denote logic as this is easier to maintain in the long term.

The configuration of such tables takes time, and the model tool 120 can fully automate the configuration of such metaphors directly from the analysis artifact that was produced during requirement gathering phase—thus introducing significant efficiencies in the software delivery process.

Extensive unit testing of these decision metaphors manually is not cost effective—if done fully manually—as the effort for data preparation is, quite expectedly, very large. On the other hand, customers typically demand that the configurations be unit tested, and require that proof of testing be provided. The decision metaphor model tool 120 also solves this problem by automatically profiling the tables and generating very large amounts of test data. For example, the profiling algorithm determines how many tests to be generated. For very simple tables with 5 or 10 rows, it can determine 10's to 100's of tests, while for larger, multi-dimensional tables, the profiler can generate 1000's of tests or more to fully and comprehensively cover all configurations (to the level of boundary conditions).

The decision metaphor model tool 120 solves this problem by automating test data creation by, in some implementations, profiling individual cells/bins of tables and scorecard models. While profiling, it can also take into account boundary conditions (where a bin/cell is bound to numeric variable and participates in a range) and also negative conditions for each rule generated from the metaphor. This way, all data preparation for unit testing can be automated with no manual activity involved. This decision metaphor model tool 120 generated test data can then be used directly in testing artifacts 110 while also testing decision metaphors.

Profiling Decision Metaphors

The decision metaphor model tool 120 can read in design configuration of tables and scorecards from a file with a pre-defined format, and can run the profiling algorithm to generate the following:

1) Data that satisfies the condition generated by that cell or bin. In other terms, positive test data.

2) Data that does not satisfy the condition of the cell or bin. In other terms, negative test data.

3) One or more positive test case per row/cell/bin of the entity.

4) One negative test case per row/cell/bin of the entity.

5) All boundary conditions of numeric variables of cells/bin.

6) For all positive test cases, the expected outcome from the entity. In case of scorecards, this is the expected score from the scorecard.

This data can be in the form of a CSV file, added to the table profile files 150, with one column per cell/characteristic of the entity and a final column for expected output. In addition, for scorecards, unexpected bin names and partial scores can also be generated.

Figure 3:
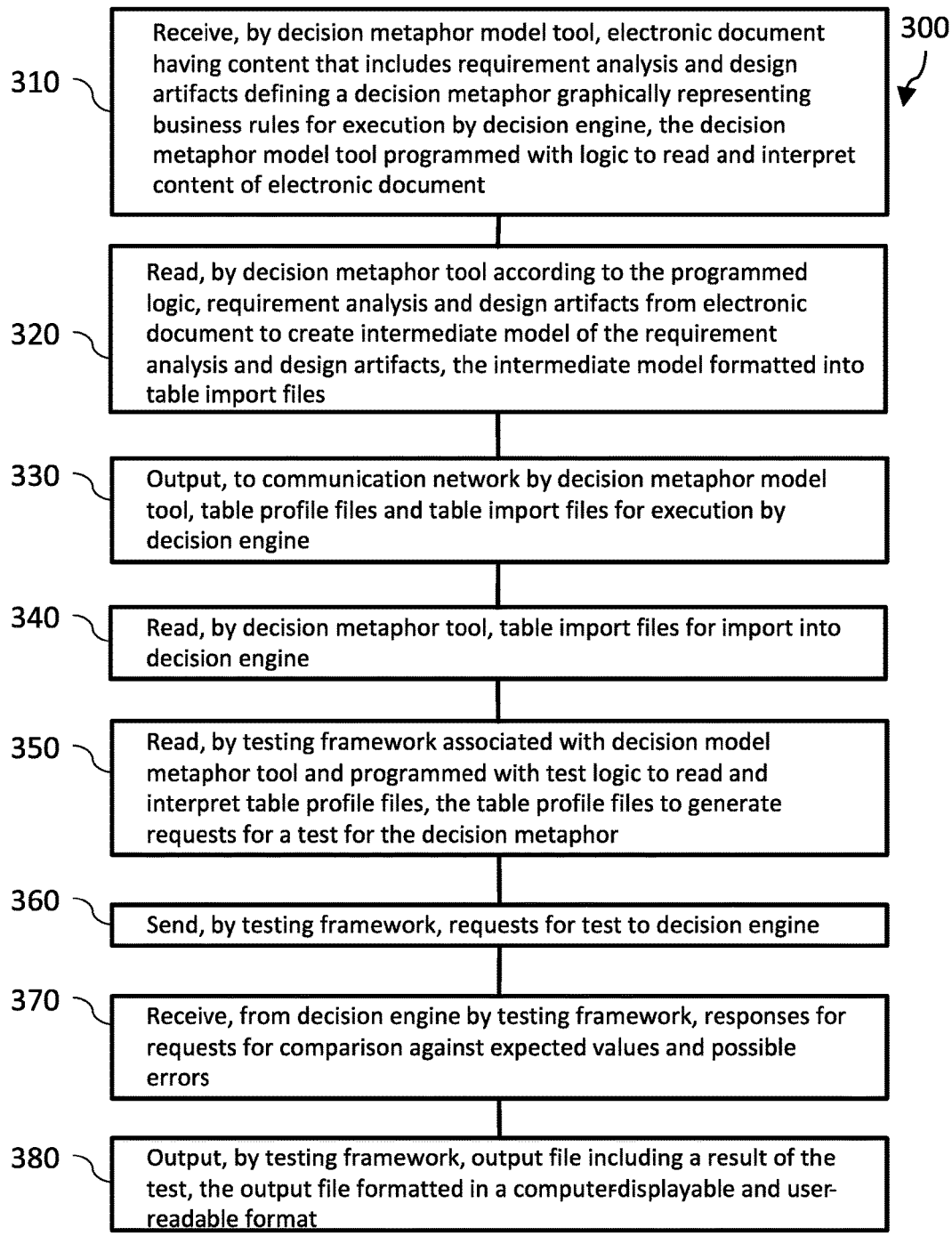
FIG. 3 is a process flow diagram illustrating the automation of generating test cases for a decision model based on requirement analysis and design artifacts.

FIG. 3 is a process flow diagram 300 illustrating the automation of generating test cases for a decision model based on requirement analysis and design artifacts 110.

At 310, a decision metaphor model tool 120 can receive an electronic document having content that includes requirement analysis and design artifacts 110 in a computer-readable format. The requirement analysis and design artifacts 110 can define a decision metaphor that graphically represents business rules for execution by a decision engine 140. The decision metaphor model tool 120 can be programmed with logic to read and interpret the content of the electronic document.

At 320, the decision metaphor model tool 120 can read, according to the programmed logic, the requirement analysis and design artifacts 110 from the electronic document to create an intermediate model of the requirement analysis and design artifacts 110. The intermediate model can be formatted into one or more computer-readable table import files 130.

At 330, the decision metaphor model tool 120 with the intermediate model, can output, to a communication network, table profile files 150 containing test data for testing of the decision metaphor. Table profile files 150 can also be output at this stage by the decision metaphor model tool 120.

At 340, the decision metaphor model tool 120 can read the table import files 130 for import into the decision engine 140.

At 350, a testing framework 160 associated with the decision metaphor model tool 120 and being programmed with test logic to read and interpret the table profile files 150, can read the table profile files 150 to generate requests for a test for the decision metaphor.

At 360, the testing framework 160 can send the requests for the test to the decision engine 140.

At 370, the testing framework 160 can receive, from the decision engine 140, responses for the requests for comparison against expected values and possible errors; and At 380, the testing framework 160 can output an output file that includes a result of the test, the output file being formatted in a computer-displayable and user-readable graphical format.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT), a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

The present invention will be described by ways of embodiments. It should be noted that following embodiments do not limit the appended claims and all the combinations of the features described in the embodiments are not necessarily essential to the means for solving the problems of the embodiments.

What is claimed is:

1. A method for implementation by one or more data processors, the method for automation of generating test cases for a decision model, the method comprising:

receiving, by a decision metaphor model tool executed by at least one data processor, an electronic document having content that includes requirement analysis and design artifacts in a computer-readable format, the requirement analysis and design artifacts defining a decision metaphor that graphically represents business rules for execution by a decision engine executed by the at least one data processor, the decision metaphor model tool being programmed with logic to read and interpret the content of the electronic document;

reading, by the decision metaphor model tool according to the programmed logic, the requirement analysis and design artifacts from the electronic document to create an intermediate model of the requirement analysis and design artifacts, the intermediate model being formatted into one or more computer-readable table import files;

outputting, to a communication network by the decision metaphor model tool with the intermediate model, at least one of the table import files and one or more table profile files containing test data for exhaustively testing one or more possible scenarios of the intermediate model including negative conditions to determine upper and lower boundary cases and ranges and values that are to be tested based on at least analysis of the design artifacts;

generating, by the decision metaphor model tool, second table profile files comprising boundary conditions or the negative test conditions that violate one or more of the business rules or the boundary conditions generated by the decision metaphor model tool;

reading, by the decision metaphor model tool, the one or more table import files for import into the decision engine;

reading, by a testing framework executed by the at least one data processor, the testing framework being associated with the decision metaphor model tool and being programmed with test logic to read and interpret the one or more table profile files, the one or more table profile files containing the test data for testing of the decision metaphor to generate requests for tests for the decision metaphor;

sending, by the testing framework, the requests for the tests to the decision engine;

receiving, from the decision engine by the testing framework, responses for the requests for the tests and comparing the responses against expected values to identify errors; and outputting, by the testing framework, an output file that includes results of comparing the responses against the expected values, the results including at least the identified errors, the output file being formatted in a computer-displayable and user-readable graphical format.

2. The method of claim 1, further comprising comprising: storing the generated second table profile files with the one or more table profile files.

3. The method of claim 1, further comprising adding, to the table profile files by the decision metaphor model tool, an expected outcome, including at least the expected values, from testing the decision metaphor with the decision engine.

4. The method of claim 1, wherein the decision metaphor model tool accepts the electronic document when it is in a pre-formatted spreadsheet document comprising at least one of: operators, range values, or partial scores.

5. The method of claim 1, further comprising transmitting, from the testing framework to a computing system coupled to a graphical display, instructions for displaying the identified errors in the graphical display.

6. A computer program product comprising a non-transient, machine-readable medium storing instructions which, when executed by at least one programmable processor, cause the at least one programmable processor to perform operations for automation of generating test cases for a decision model, the operations comprising:

receiving, by a decision metaphor model tool executed by at least one data processor, an electronic document having content that includes requirement analysis and design artifacts in a computer-readable format, the requirement analysis and design artifacts defining a decision metaphor that graphically represents business rules for execution by a decision engine executed by the at least one data processor, the decision metaphor model tool being programmed with logic to read and interpret the content of the electronic document;

reading, by the decision metaphor model tool according to the programmed logic, the requirement analysis and design artifacts from the electronic document to create an intermediate model of the requirement analysis and design artifacts, the intermediate model being formatted into one or more computer-readable table import files;

outputting, to a communication network by the decision metaphor model tool with the intermediate model, at least one of the table import files and one or more table profile files containing test data for exhaustively testing one or more possible scenarios of the intermediate model including negative conditions to determine upper and lower boundary cases and ranges and values that are to be tested based on at least analysis of the design artifacts generating, by the decision metaphor model tool, second table profile files comprising boundary conditions or the negative test conditions that violate one or more of the business rules or the boundary conditions generated by the decision metaphor model tool;

reading, by the decision metaphor model tool, the one or more table import files for import into the decision engine;

reading, by a testing framework executed by the at least one data processor, the testing framework being associated with the decision metaphor model tool and being programmed with test logic to read and interpret the one or more table profile files, the one or more table profile files containing the test data for testing of the decision metaphor to generate requests for tests for the decision metaphor;

sending, by the testing framework, the requests for the tests to the decision engine;

receiving, from the decision engine by the testing framework, responses for the requests for the tests and comparing the responses against expected values to identify errors; and outputting, by the testing framework, an output file that includes results of comparing the responses against the expected values, the results including at least the identified errors, the output file being formatted in a computer-displayable and user-readable graphical format.

7. The computer program product of claim 6, the operations further comprising:
storing the generated second table profile files with the one or more table profile files.

8. The computer program product of claim 6, the operations further comprising adding, to the table profile files by the decision metaphor model tool, an expected outcome, including at least the expected values, from testing the decision metaphor with the decision engine.

9. The computer program product of claim 6, wherein the decision metaphor model tool only accepts the electronic document when it is in a pre-formatted spreadsheet document comprising at least one of: operators, range values, or partial scores.

10. The computer program product of claim 6, further comprising transmitting, from the testing framework to a computing system coupled to a graphical display, instructions for displaying the identified errors in the graphical display.

11. A system comprising:
a programmable processor; and
a non-transient machine-readable medium storing instructions which, when executed by the processor, cause the at least one programmable processor to perform operations for automation of generating test cases for a decision model, the operations comprising:

receiving, by a decision metaphor model tool executed by at least one data processor, an electronic document having content that includes requirement analysis and design artifacts in a computer-readable format, the requirement analysis and design artifacts defining a decision metaphor that graphically represents business rules for execution by a decision engine executed by the at least one data processor, the decision metaphor model tool being programmed with logic to read and interpret the content of the electronic document;

reading, by the decision metaphor model tool according to the programmed logic, the requirement analysis and design artifacts from the electronic document to create an intermediate model of the requirement analysis and design artifacts, the intermediate model being formatted into one or more computer-readable table import files;

outputting, to a communication network by the decision metaphor model tool with the intermediate model, at least one of the table import files and one or more table profile files containing test data for exhaustively testing one or more possible scenarios of the intermediate model including negative conditions to determine upper and lower boundary cases and ranges and values that are to be tested based on at least analysis of the design artifacts generating, by the decision metaphor model tool, second table profile files comprising boundary conditions or the negative test conditions that violate one or more of the business rules or the boundary conditions generated by the decision metaphor model tool;

reading, by the decision metaphor model tool, the one or more table import files for import into the decision engine;

reading, by a testing framework executed by the at least one data processor, the testing framework being associated with the decision metaphor model tool and being programmed with test logic to read and interpret the one or more table profile files, the one or more table profile files containing the test data for testing of the decision metaphor to generate requests for tests for the decision metaphor;

sending, by the testing framework, the requests for the tests to the decision engine;

receiving, from the decision engine by the testing framework, responses for the requests for the tests and comparing the responses against expected values to identify errors; and outputting, by the testing framework, an output file that includes results of comparing the responses against the expected values, the results including at least the identified errors, the output file being formatted in a computer-displayable and user-readable graphical format.

12. The system of claim 11, the operations further comprising:
storing the generated second table profile files with the one or more table profile files.

13. The system of claim 11, the operations further comprising adding, to the table profile files by the decision metaphor model tool, an expected outcome, including at least the expected values, from testing the decision metaphor with the decision engine.

14. The system of claim 11, wherein the decision metaphor model tool only accepts the electronic document when it is in a pre-formatted spreadsheet document comprising at least one of: operators, range values, or partial scores.

15. The system of claim 11, the operations further comprising transmitting, from the testing framework to a computing system coupled to a graphical display, instructions for displaying the identified errors in the graphical display.

16. The method of claim 1, wherein positive and negative test cases are generated by the decision metaphor model tool.

17. The method of claim 16, wherein the positive and negative test cases generated are stored as part of the table profile files for the intermediate model.

* * * * *